United States Patent [19]

Sundholm

[11] 4,426,103

[45] Jan. 17, 1984

[54] FLANGE JOINT

[76] Inventor: Göran Sundholm, Nahkelavägen, 04300 Hyrylä, Finland

[21] Appl. No.: 242,398

[22] Filed: Mar. 10, 1981

[30] Foreign Application Priority Data

Mar. 14, 1980 [FI] Finland .................................. 800806

[51] Int. Cl.³ .............................................. F16L 25/00
[52] U.S. Cl. ...................................... 285/12; 285/158; 285/178; 285/368
[58] Field of Search ............... 285/178, 158, 363, 368, 285/412, 404, 358, 394, 314, 12; 403/337, 338, 409, 405, 408, 262

[56] References Cited

U.S. PATENT DOCUMENTS

| 2,082,173 | 6/1937 | Miller ............................... 285/178 X |
| 3,447,821 | 6/1969 | Bochory ................................ 285/178 |
| 3,493,249 | 2/1970 | Conrad et al. .................. 285/178 X |
| 4,225,264 | 9/1980 | Coone ............................ 285/178 X |

FOREIGN PATENT DOCUMENTS

| 924750 | 4/1973 | Canada ................................ 285/158 |
| 122754 | 2/1919 | United Kingdom ................ 285/178 |

*Primary Examiner*—Dave W. Arola
*Attorney, Agent, or Firm*—Scully, Scott, Murphy & Presser

[57] ABSTRACT

The invention relates to a flange joint for use at relatively low pressures, whereby the pipe to be joined is provided with a peripheral shoulder against which a flange abuts, the flange being tightened by means of clamping bolts. For each clamping bolt is provided a separate flange piece which abuts against only a small portion of the peripheral shoulder.

6 Claims, 8 Drawing Figures 4,426,103

FLANGE JOINT

BACKGROUND OF THE INVENTION

The present invention relates to a flange joint in which the end of the pipe to be joined is provided with a peripheral shoulder against which a flange to be tightened by means of bolts or similar is adapted to abut.

Conventional techniques relating to flange joints involve the arrangement of a flange around the pipe end which flange abuts against the pipe end shoulder continuously around the pipe. In general the flange is made in one piece. In joints to fixed connections, such as pumps, provided with threaded bores for clamp bolts the flange is relatively often made of two halves in order to facilitate the installation.

In each case specially dimensioned flanges are required for each pipe size, in addition to which the division and the number of clamp bolts differ. An example of this is the standard SAE (J 518 c) which for pipe sizes from $\frac{1}{2}"$ to 5" requires fifteen different flanges. Moreover, the flanges are to a great extent used in connections with relatively low pressure, less than about 50 bar, for example, in water pumps, on the suction side in hydraulic applications, etc, in which cases only a fraction of the holding capacity of the flange is utilized.

The object of the present invention is to provide a new flange joint which overcomes the above-mentioned disadvantages.

SUMMARY OF THE INVENTION

The flange joint according to the invention is mainly characterized in that for each clamp bolt is arranged a separate flange piece adapted to abut axially against the peripheral shoulder in the pipe end.

Thus, the individual flange pieces each abut only against a relatively small portion of the peripheral shoulder in the pipe end which, however, is quite sufficient at rather low pressures of up to about 50 bar. However, the invention can also be applied at higher pressures by inserting between the clamp bolts and the flange pieces a continuous support plate which provides an additional holding capacity.

An essential advantage of the invention is that the individual flange pieces can be made identical with each other and, consequently, can be used for practically all existing pipe sizes. In addition, a substantial saying of material is achieved as compared to continuously encircling flanges. The flange pieces are further inexpensive to manufacture in present automatic machines, especially if they are made of two cylindrical sections each having a different diameter. In this case the flange piece abuts axially against the peripheral shoulder of the pipe end with the end surface of the section of a larger diameter and preferably radially against the shoulder with the mantle surface of the section of a smaller diameter.

A flange joint according to the invention is also easy to dismount in the radial direction, for example, in the case of four flange pieces spaced uniformly around the periphery of the pipe end, by removing one flange piece and by easing off the clamp bolts on the remaining pieces.

Preferably the individual flange pieces can be shaped eccentrically in any of the following manners:

both cylindrical section in the flange piece are concentric while the through bore is eccentric;

the cylindrical section of the flange piece of a larger diameter and the through bore and concentric while the cylindrical section of the flange piece of a smaller diameter is eccentric.

The last-mentioned embodiment has the advantage of requiring a minimum of material and space. A common feature in the different eccentric embodiments is that an exact abutment of the flange pieces against the peripheral shoulder in the pipe end is achieved regardless of the variation in the width thereof or of irregularities of the placement of the threaded bore holes into which the respective clamp bolts are intended to be screwed. Any errors in division can be easily compensated. Other than cylindrical shapes can, of course, also come into question.

If the clamp bolts are provided with two oppositely directed threaded sections, each flange piece can advantageously be provided with an inner threading, whereby the flange piece will be pressed against the peripheral shoulder in the pipe and through said inner threading. This embodiment has a certain advantage over flange pieces with a plain bore because the play between the flange piece and the threads in the bolt is minimal, owing to which side forces occurring during tightening are somewhat better taken up by the clamp bolt. However, it should pointed out that neither a plain bore in the flange pieces generally does not cause problems in this respect because the peripheral shoulder of the pipe end usually is rather thin (in the axial direction of the pipe).

The flange joint according to the invention is primarily intended for use in connections in which a pipe end is to be joined to a fixed connecting piece provided with threaded bores into which the clamp bolts are intended to be screwed. However, the invention is also applicable in scarfed joints if a holding ring preventing the flanges from sliding radially outwards is arranged round the cylindrical sections of the flange pieces of a smaller diameter.

BRIEF DESCRIPTION OF THE DRAWINGS

In the following the invention will be described with reference to the accompanying drawing.

DETAILED DESCRIPTION OF PREFERRED EMBODIMENTS

Figure 1:
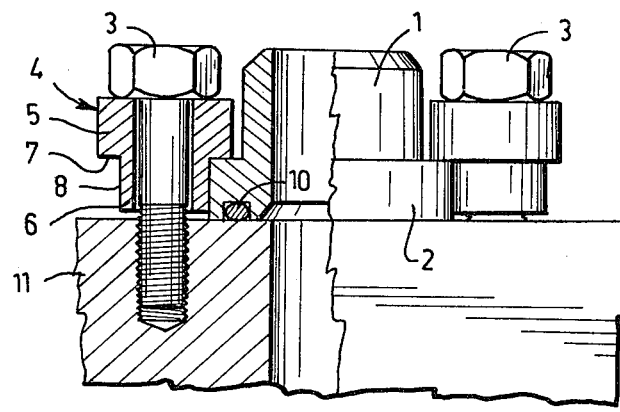
FIGS. 1 and 2 are side and end views, respectively, of a flange joint according to the invention illustrating the basic idea of the invention.

The end of the pipe to be joined is designated by numeral 1, and the fixed connection piece to which the pipe is to be joined, for example, a pump is denoted by numeral 11. The pipe 1 is in its end abutting against the connection piece 11 provided with a peripheral shoulder 2. The joint is tightened by means of bolts 3 which are screwed into bores in the connection piece 11, said bores, however, not being shown in FIG. 1. Contrary to hitherto existing flange joints, the invention does not employ a flange abutting continuously against the shoulder 2 around the pipe 1 but, instead, a separate flange piece 4 for each clamp bolt 3. In the embodiments shown in the drawings said flange pieces comprise two cylindrical sections 5 and 6 of different diameters so that the end surface 7 of the larger cylindrical section 5 abuts axially against the shoulder 2 while the outer mantle surface 8 of the smaller cylindrical section 6 abuts radially against the shoulder 2. As appears clearly, e.g., from FIG. 2, the flange pieces 4 abut in total only against a relatively small portion of the shoulder 2 which, however, is quite sufficient for the pressure primarily concerned herein, namely pressure of up to about 50 bar. A sealing between the pipe end 1 and the connection 11 is provided in the conventional manner by means of a sealing ring 10 accommodated in a groove in the end surface of the pipe end.

The same flange pieces 4 can be used for a plurality of different pipe diameters. Thus, the earlier mentioned seventeen different flanges for the standard SAE (I 518 c) can be substituted by only six different flange pieces of the kind disclosed herein which, moreover, are easy and inexpensive to manufacture while utilizing existing automatic machines.

Figure 2:
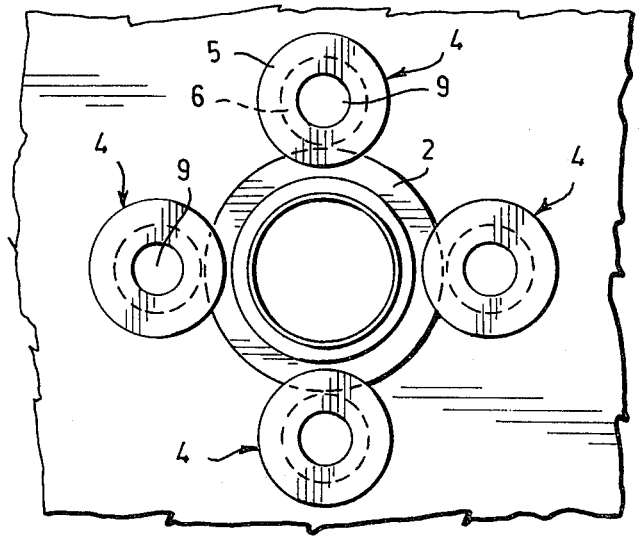

FIG. 2 shows an embodiment in which both cylindrical sections 5 and 6 in the flange pieces 4 and the bore 9 passing through them are all concentric with each other.

Figures 3, 4, 5:
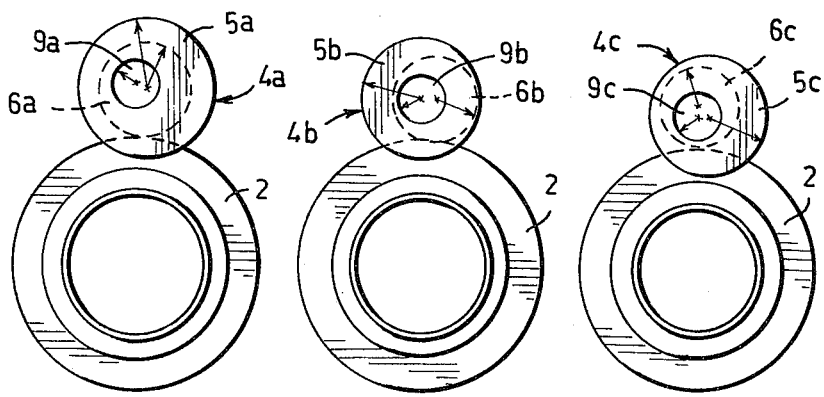
FIGS. 3 to 5 illustrate preferred embodiments of the flange pieces used in the joint.

FIG. 3 shows an embodiment of the invention in which each flange piece, denoted 4a, is provided with concentric cylindrical sections 5a and 6a while the through bore 9a is eccentrically arranged.

FIG. 4 shows an embodiment in which each flange pieces 4b has its cylindrical section 5b of a larger diameter and the through bore 9b arranged concentrically with each other while the cylindrical section 6b of a smaller diameter is eccentric. FIG. 5 further shows an embodiment in which the corresponding parts 5c, 6c and 9c of the flange piece 4c are all eccentric with respect to each other. These eccentric embodiments always permit, through a suitable rotation, an exact fitting-in against the shoulder 2. In the embodiment according to FIG. 5, the cross-sectional circles of the cylindrical sections 5c and 6c are tangent to each other, which results in a minimal consumption of material and a minimal need for space. When the bore hole in the embodiments according to FIGS. 3 and 5 is suitably positioned, it is also possible to turn the flange piece entirely free of the peripheral shoulder 2 in the pipe end.

Figure 6:
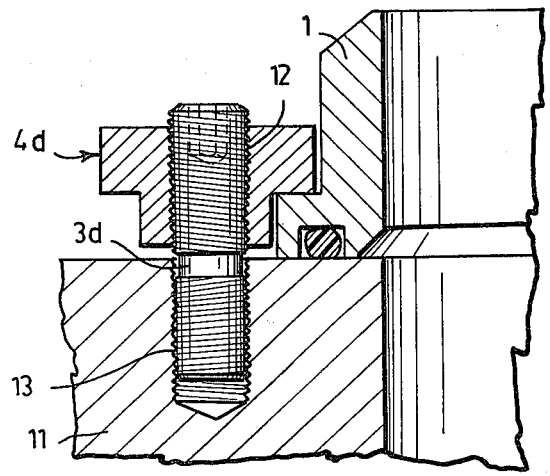
FIG. 6 shows an embodiment in which the clamp bolts are provided with two sets of oppositely directed threads.

FIG. 6 illustrates an alternative embodiment in which a special screw 3d is utilized which is provided with two section 12 and 13 threaded in opposite directions. The bore in the flange piece 4d is provided with a threading corresponding to the threading 12 in the screw 3d. The joint is tightened through the thread portion 12 and the corresponding inner threading in the flange piece 4d while turning the screw 3d. This embodiment has the advantage that the play between the thread 12 and the inner thread of the flange piece is minimal, owing to which side forces occurring during tightening are more uniformly distributed over the entire screw, which is of advantage if the construction is relatively high.

Figure 7:
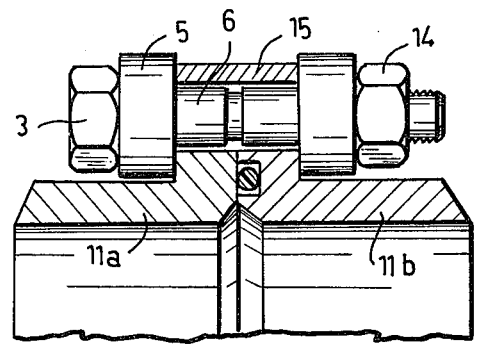
FIG. 7 illustrates the application of the invention in a scarf joint.

In FIG. 7, the afore-mentioned fixed connection 11 is replaced by a welding nipple 11a, which makes the connection 11a, 11b, conventional scarf joint. The connections is in this case tightened by means of a nut 14, and the separate flange pieces in the connection are held in place against radial movement outwards by means of a holding ring 15 which is arranged outside the sections 6 of the flange pieces of a smaller diameter.

Figure 8:
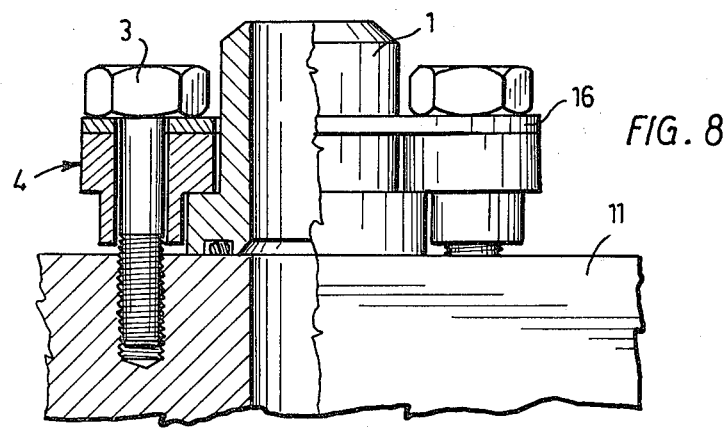
FIG. 8 shows an embodiment intended for use at higher pressures than the embodiments shown in FIGS. 1 to 7.

In the embodiment according to FIG. 8, a support plate 16 is placed between the heads of the clamp nuts 3 and the flange pieces 4. Said plate is, on one hand, provided with a central hole for threading on the pipe end 1 and, on the other hand, with holes for the clamp bolts 3. In this way the connection will be better held together in the radial direction, which makes it possible to use the separate flange pieces 4 in connections of higher pressures requiring a correspondingly greater tightening moment.

What I claim is:

1. A flange joint for coupling the end of a pipe, provided with a peripheral shoulder around the pipe end, to a connecting piece against which the pipe end abuts, comprising a plurality of individual separate, flange pieces, each of which is tightened by an individual attachment means to the connecting piece, each flange piece having two cylindrical sections of different diameters, a larger diameter and a smaller diameter joined at an abutting shoulder, and an axial through bore extending axially through the two cylindrical sections with the abutting shoulder of each flange piece axially abutting against the peripheral shoulder of the pipe end, and said axial bore being positioned eccentrically with respect to the smaller diameter cylindrical section and the entire smaller diameter cylindrical section lying outside of the boundries of said peipheral shoulder and pipe end thereby allowing a variety of peripheral shoulder sizes to be connected to said connecting piece.

2. A flange joint as claimed in claim 1, wherein each attachment means is a clamp bolt.

3. A flange joint as claimed in claim 1, wherein both cylindrical sections of the flange piece are positioned concentric with respect to each other, and said axial bore is positioned eccentric with respect to both cylindrical sections.

4. A flange joint as claimed in claim 1, characterized in that the larger diameter cylindrical section of the flange piece and the through bore are concentric.

5. A flange joint as claimed in claim 1, further comprising a holding ring arranged around the smaller diameter cylindrical sections of the flange pieces for preventing radial movement outwards.

6. A flange joint as claimed in claim 2, adapted for high pressures, further comprising a separate support plate, formed as one integral piece, arranged between the clamp bolts and the individual, separate flange pieces.

* * * * *